D. HYDE.
Bearing for Rub-Roll Shaft.
No. 204,046. Patented May 21, 1878.
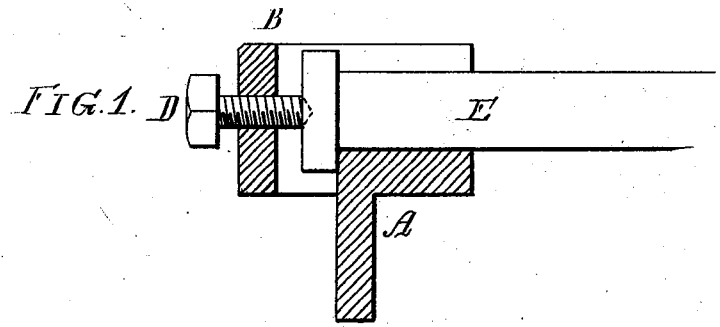
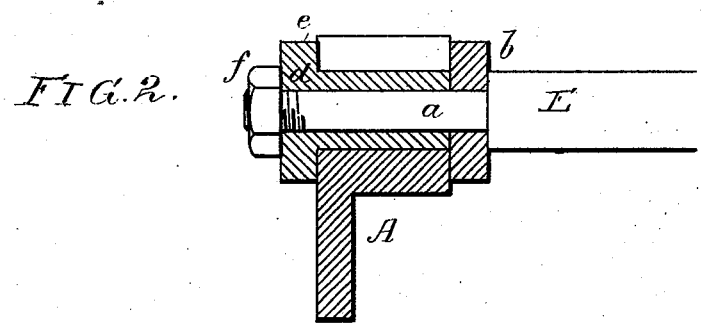
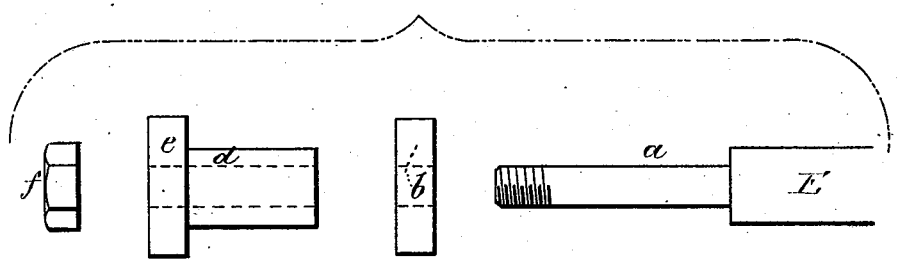

UNITED STATES PATENT OFFICE.

DANIEL HYDE, OF PHILADELPHIA, PENNSYLVANIA, ASSIGNOR TO WILLIAM TETLOW, JAMES LINDSAY, DANIEL HYDE, AND WILLIAM G. LINDSAY, OF SAME PLACE.

IMPROVEMENT IN BEARINGS FOR RUB-ROLL SHAFTS.

Specification forming part of Letters Patent No. 204,046, dated May 21, 1878; application filed March 4, 1878.

*To all whom it may concern:*

Be it known that I, DANIEL HYDE, of Philadelphia, Pennsylvania, have invented a new and useful Improvement in Bearings for Rub-Roll Shafts, of which the following is a specification:

The object of my invention is to so construct a bearing for rub-roll shafts as to readily compensate for the effects of wear and yet permit the free vertical movement of the bearing when necessary; and this object I attain in the manner which I will now proceed to describe, reference being had to the accompanying drawing, in which—

Figure 1 is a sectional view of an ordinary bearing for rub-roll shafts; Fig. 2, a sectional view of my improved bearing, and Fig. 3 a side view of the parts of the journal detached from each other.

In ordinary rub-roll bearings, such as shown in Fig. 1, a yoke, B, extends outward from the bearing A, and through this yoke passes a set-screw, D, the conical end of which enters a conical recess in the flanged end of the rub-roll shaft E, so that, as the latter wears, the screw may be set up to compensate for such wear.

The main objection to this mode of construction is that the shaft E is rigidly held, and cannot rise if a sliver becomes wrapped round the rub-roll, thus causing the bending of the shaft, or otherwise injuring the machine.

In carrying out my invention I discard the yoke B and set-screw D, and reduce the end of the shaft E, so as to form a stem, *a*, which is threaded at the outer end.

Over this stem is slipped, first, a washer, *b*, and then a sleeve, *d*, having at the outer end a flange, *e*, the washer *b* bearing against the shoulder formed by reducing the shaft, while the sleeve *d* is confined in place against the washer by means of a nut, *f*, adapted to the threaded end of the stem *a*.

The sleeve *d* is adapted to the bearing A, the washer *b* being in contact with the inner edge of the said bearing, and the flange *e* in contact with the outer edge of the same, so that the shaft E is held firmly in position laterally, but at the same time free vertical movement of the shaft in the bearing is permitted.

When any of the parts become worn, the loss by such wear can be readily taken up by slightly filing the inner end of the sleeve *d*.

Another advantage of my invention is that the rub-roll can be readily removed and replaced without requiring any adjustment of the bearing, thereby overcoming a serious objection to the ordinary form of bearing, in which it is necessary to loosen the adjusting-screw before the removal of the roll, and to readjust said screw after the roll has been returned to its place.

My invention may be readily applied to ordinary rub-roll shafts and bearings, the former being merely reduced at the end, so as to form the stem *a*, and the bearings being deprived of the yokes B.

If desired, however, a fixed collar on the shaft E may take the place of the washer *b*, although the latter is to be preferred.

I claim as my invention—

The combination of the bearing A with the shaft E, its threaded stem *a*, collar or washer *b*, flanged sleeve *d*, and nut *f*, as specified.

In testimony whereof I have signed my name to this specification in the presence of two subscribing witnesses.

DANIEL HYDE.

Witnesses:
HARRY A. CRAWFORD,
HARRY SMITH.